United States Patent [19]

Mayhew et al.

[11] Patent Number: 4,940,003
[45] Date of Patent: Jul. 10, 1990

[54] CAR SEAT TABLE

[76] Inventors: Susan L. Mayhew; Richard K. Mayhew, II, both of 4311 Landeros Ave., La Verne, Calif. 91750

[21] Appl. No.: 370,183

[22] Filed: Jun. 23, 1989

[51] Int. Cl.$^5$ .............................................. A47B 23/00
[52] U.S. Cl. ........................................ 108/44; 108/25; 108/93
[58] Field of Search ..................... 108/25, 26, 93, 145; 297/194, 188; 248/311.2; 211/74, 75; 312/235.8

[56] References Cited

U.S. PATENT DOCUMENTS

| | | | |
|---|---|---|---|
| 2,837,388 | 6/1958 | Majeroni et al. | 108/25 |
| 2,837,394 | 6/1958 | Rahall | 108/25 |
| 3,181,483 | 5/1965 | De Vitt et al. | 108/25 |
| 3,244,125 | 4/1966 | Mackey | 108/25 |
| 3,338,629 | 8/1967 | Drees | 297/194 |
| 3,532,221 | 10/1970 | Kaluhiokalani et al. | 108/26 X |
| 4,512,503 | 4/1985 | Gioso | 297/194 X |
| 4,530,479 | 7/1985 | Chen | 248/311.2 X |
| 4,629,153 | 12/1986 | Marcum | 248/311.2 X |
| 4,813,751 | 3/1989 | Fenn | 297/188 X |

FOREIGN PATENT DOCUMENTS

| | | | |
|---|---|---|---|
| 2300520 | 10/1976 | France | 108/25 |
| 999010 | 7/1965 | United Kingdom | 108/145 |
| 2146894 | 5/1985 | United Kingdom | 108/25 |

Primary Examiner—Peter A. Aschenbrenner
Attorney, Agent, or Firm—Jerry T. Kearns

[57] ABSTRACT

A car seat table is designed for securement on a horizontal seat portion of a rear vehicle seat utilizing a conventional central seat belt. An upper and a lower tray are secured in spaced parallel relation by a frame formed from rigid tubular members. A pair of circular openings are formed through the upper tray for supporting beverage containers. Removable inserts may be utilized to adapt the tray for use with various different dimensioned beverage containers. The inserts may include resilient radially inwardly extending fingers for engagement with and accommodation of various different diameter beverage containers. The upper tray preferably includes an upstanding peripheral rim and a central recessed area for containing various food and other items for use by back seat vehicle occupants. In a second embodiment, the upper and lower trays may be mounted for vertical adjustment between raised and lowered positions by a parallelogram linkage.

1 Claim, 3 Drawing Sheets

CAR SEAT TABLE

BACKGROUND OF THE INVENTION

1. Field of the Invention

The present invention relates to car seat tables, and more particularly pertains to a car seat table adapted for securement by a conventional seat belt on a central horizontal portion of a rear vehicle seat. Vehicle occupants, especially children, in the rear seats of a vehicle require a table or tray for the convenient support of beverages, foods and other items. While some conventional vehicles are provided with beverage holders disposed on the back portion of the front vehicle seats, these holders are located out of the reach of small children when they are wearing their seat belts. In order to overcome this problem, the present invention provides a car seat table including provisions for the support of foods, beverages and other items.

2. Description of the Prior Art

Various types of car seat tables are known in the prior art. A typical example of such a car seat table is to be found in U.S. Pat. No. 3,163,287, which issued to B. Barnett on Dec. 29, 1964. This patent discloses a vehicle tray having a plurality of circular openings for holding beverage containers and having a flanged support bracket adapted for mounting on the transmission hump of a vehicle. U.S. Pat. No. 4,010,696, which issued to H. Priesman on Mar. 8, 1977, discloses a tray for use in an automobile provided with folding legs adapted for mounting over the transmission hump of a vehicle. U.S. Pat. No. 4,341,418, which issued to A. Chappell on July 27, 1982, discloses a car seat table foldable for storage beneath a vehicle seat. U.S. Pat. No. 4,359,004, which issued to A. Chappell on Nov. 16, 1982, discloses a folding car seat table having a mounting bracket including a pair of weighted bags adapted for engagement over the transmission hump of a vehicle. U.S. Pat. No. 4,524,701, which issued to A. Chappell on June 25, 1985, discloses a car seat table having a pair of spike flanges for engagement with a vehicle carpet over a transmission hump and including a tray having a peripheral upstanding rim.

While the above mentioned devices are directed to car seat tables, none of these devices include an upper and a lower tray secured in spaced parallel relation by a tubular supporting frame adapted for securement by a conventional vehicle seat belt. Additional features of the present invention, not contemplated by the aforesaid prior art devices include the provision of beverage container receiving openings having removable inserts with radially inwardly extending resilient fingers for supporting a variety of different diameter beverage containers. Inasmuch as the art is relatively crowded with respect to these various types of car seat tables, it can be appreciated that there is a continuing need for and interest in improvements to such car seat tables, and in this respect, the present invention addresses this need and interest.

SUMMARY OF THE INVENTION

In view of the foregoing disadvantages inherent in the known types of car seat tables now present in the prior art, the present invention provides an improved car seat table. As such, the general purpose of the present invention, which will be described subsequently in greater detail, is to provide a new and improved car seat table which has all the advantages of the prior art car seat tables and none of the disadvantages.

To attain this, representative embodiments of the concepts of the present invention are illustrated in the drawings and make use of a car seat table designed for securement on a horizontal seat portion of a rear vehicle seat utilizing a conventional central seat belt. An upper and a lower tray are secured in spaced parallel relation by a frame formed from rigid tubular members. A pair of circular openings are formed through the upper tray for supporting beverage containers. Removable inserts may be utilized to adapt the tray for use with various different dimensioned beverage containers. The inserts may include resilient radially inwardly extending fingers for engagement with and accommodation of various different diameter beverage containers. The upper tray preferably includes an upstanding peripheral rim and a central recessed area for containing various food and other items for use by back seat vehicle occupants. In a second embodiment, the upper and lower trays may be mounted for vertical adjustment between raised and lowered positions by a parallelogram linkage.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved car seat table which has all the advantages of the prior art car seat tables and none of the disadvantages.

It is another object of the present invention to provide a new and improved car seat table which may be easily and efficiently manufactured and marketed.

It is a further object of the present invention to provide a new and improved car seat table which is of a durable and reliable construction.

An even further object of the present invention is to provide a new and improved car seat table which is susceptible of a low cost of manufacture with regard to both materials and labor, and which accordingly is then susceptible of low prices of sale to the consuming public, thereby making such car seat tables economically available to the buying public.

Still yet another object of the present invention is to provide a new and improved car seat table which provides in the apparatuses and methods of the prior art some of the advantages thereof, while simultaneously overcoming some of the disadvantages normally associated therewith.

Still another object of the present invention is to provide a new and improved car seat table adapted for securement to a central horizontal rear seat portion in a vehicle by a conventional seat belt.

Yet another object of the present invention is to provide a new and improved car seat table for supporting food, beverage and other items for use by rear seat vehicle occupants.

Even still another object of the present invention is to provide a new and improved car seat table having circular beverage container receiving openings provided with removable inserts for accommodating various different diameter beverage containers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
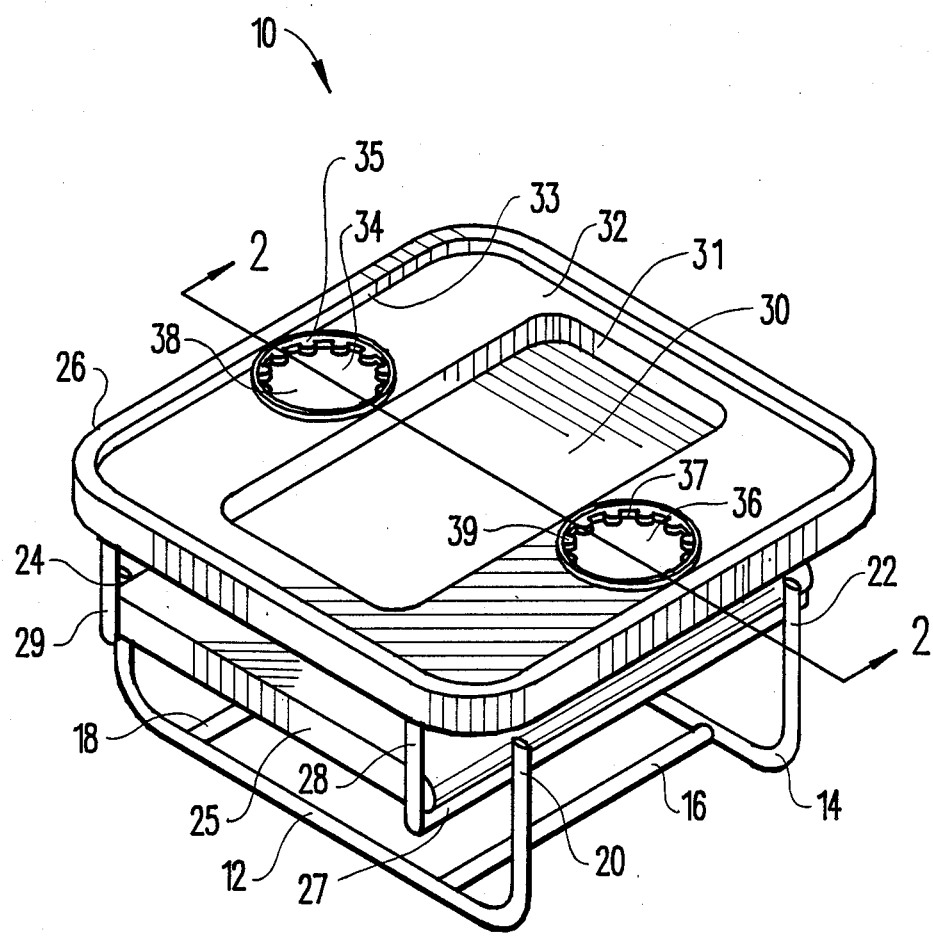
FIG. 1 is a perspective view illustrating a car seat table according to the first embodiment of the present invention.

With reference now to the drawings, and in particular to FIG. 1 thereof, a new and improved car seat table embodying the principles and concepts of the present invention and generally designated by the reference numeral 10 will be described.

More specifically, it will be noted that the first embodiment 10 of the invention includes a pair of spaced parallel tubular frame members 12 and 14 having a generally U-shaped configuration. Transverse tubular frame members 16 and 18 are secured between the frame members 12 and 14. Upper end portions 20, 22 and 24 of the frame members are secured to a rigid lower tray 25. An upper frame includes a similar pair of generally U-shaped frame members, one of which is illustrated at 27. Vertical portions 28 and 29 of the frame members extend between the lower tray 25 and an upper tray 26. The upper tray 26 has a recessed central floor portion 30 surrounded by an upstanding side wall 31 which connects the floor 30 to a raised horizontal surface 32. An upstanding peripheral rim 33 surrounds the horizontal surface 32 and serves to retain food and other items within the confines of the upper tray 26. A pair of circular openings 34 and 36 are formed through the upper tray 26 on opposite sides of the central recessed floor 30, and serve to retain cylindrical beverage containers. A pair of circular inserts 35 and 37 may be removably installed within the openings 34 and 36 to adapt the holders for use with reduced diameter beverage containers. The inserts 35 and 37 may include resilient radially inwardly extending plastic fingers 38 and 39 which are flexible to frictionally engage and retain a variety of different diameter cylindrical containers. The vertically extending portions 20 and 22 of the lower frame members 12 and 14 are dimensioned to allow passage of a conventional seat belt for securing the tray table 10 on a horizontal central portion of a rear vehicle seat.

Figure 2:
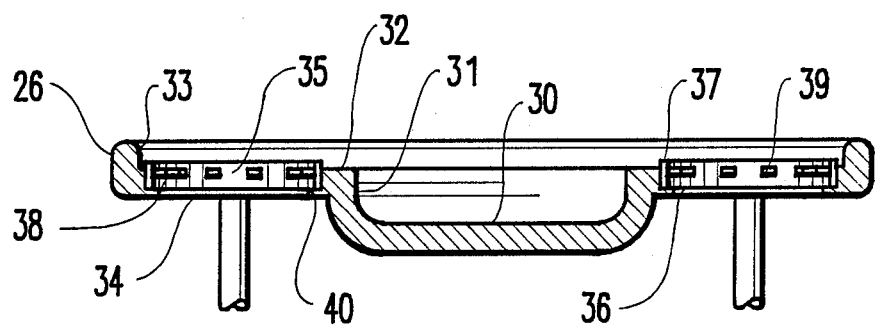
FIG. 2 is a cross sectional view, taken along line 2—2 of FIG. 1.

As illustrated in FIG. 2, a circular annular rim 40 is formed around the beverage container receiving openings 34 and 36 for supporting the circular insert 35. While illustrated with the radially inwardly extending flexible fingers 38 and 39, it should be understood that the inserts 35 and 37 may be formed with a reduced diameter unobstructed circular opening.

Figure 3:
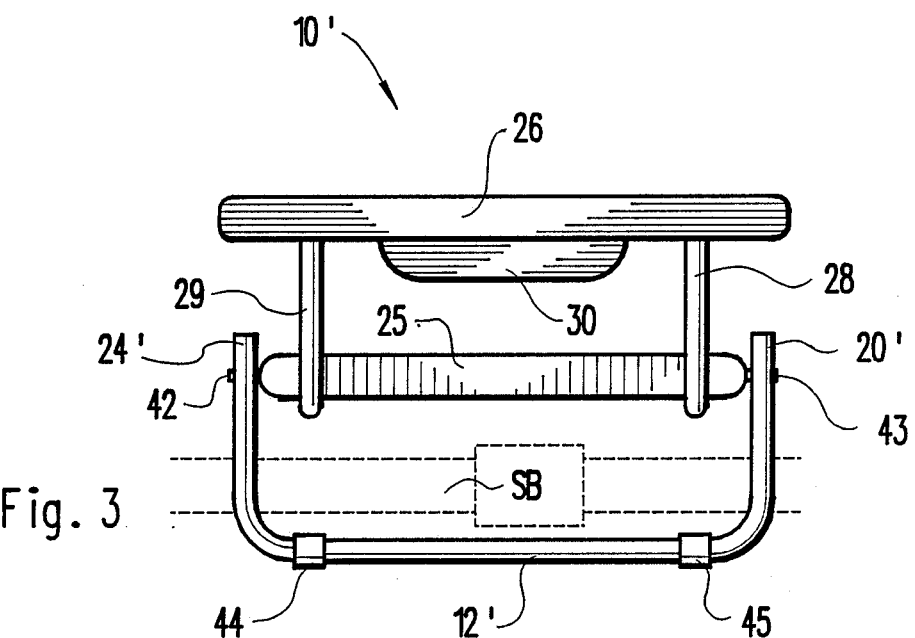
FIG. 3 is a front elevational view illustrating a car seat table according to a second embodiment of the present invention.

FIG. 3 is a front elevational view which illustrates a slightly modified tray table 10' according to a second embodiment of the invention. The lower U-shaped frame member 12' includes a pair of T-fittings 44 and 45. Vertical frame members 2' and 20' are pivotally mounted in the fittings 44 and 45 and are pivotally secured by pins 42 and 43 to side wall portions of the lower tray 25. Vertical frame members 29 and 28 secure the lower frame 25 in parallel spaced relation with the upper tray 26. A conventional vehicle seat belt SB secures the tray table 10' securely in place on a horizontal seat portion.

Figure 4:
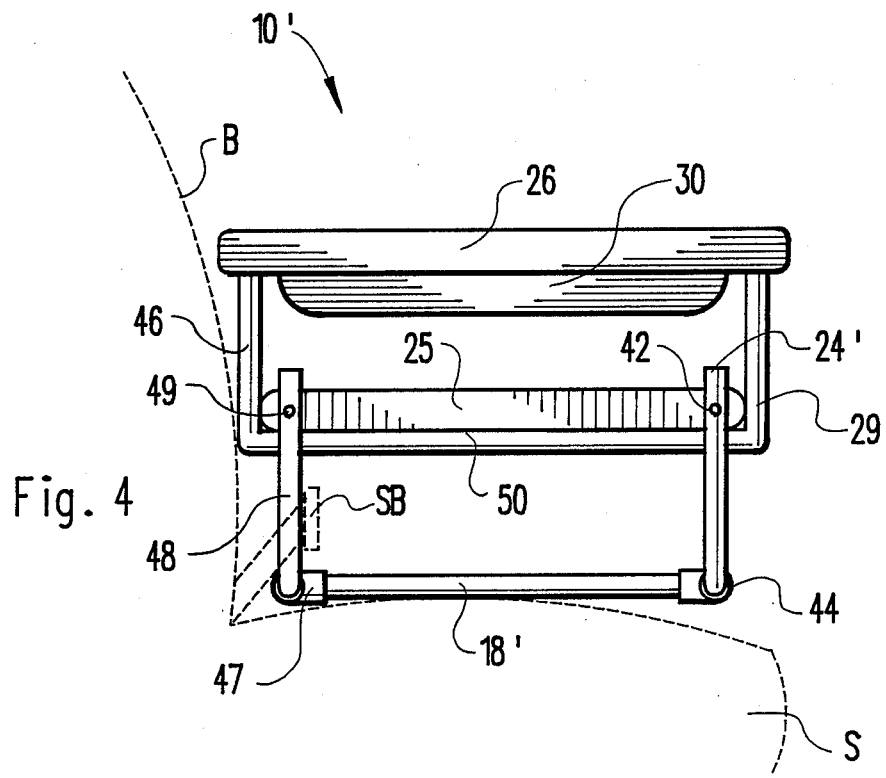
FIG. 4 is a side elevational view illustrating the car seat table of FIG. 3.

FIG. 4 illustrates the seat belt SB in engagement around a vertical lower frame portion 48 of the table 10'. The installed position of the table 10' on the horizontal portion S of a vehicle seat and in abutment with a seat back portion B may now be understood. The transverse frame member 18' is rigidly connected between the T-fittings 44 and 47. It is to be understood that the opposite side of the device is symmetrical in construction, similar to that illustrated in FIG. 1. The vertical frame members 24' and 48 are pivotally mounted in the respective T-fittings 44 and 47 and are pivotally secured by pins 42 and 49 to a side wall of the lower tray 25. Thus, the lower tray 25 is in effect mounted by a parallelogram type linkage for movement between the illustrated raised position and a lowered position. A generally U-shaped frame member 50 has vertical portions 29 and 46 which rigidly secure the lower tray 25 and the upper tray 26 in spaced parallel relation.

Figure 5:
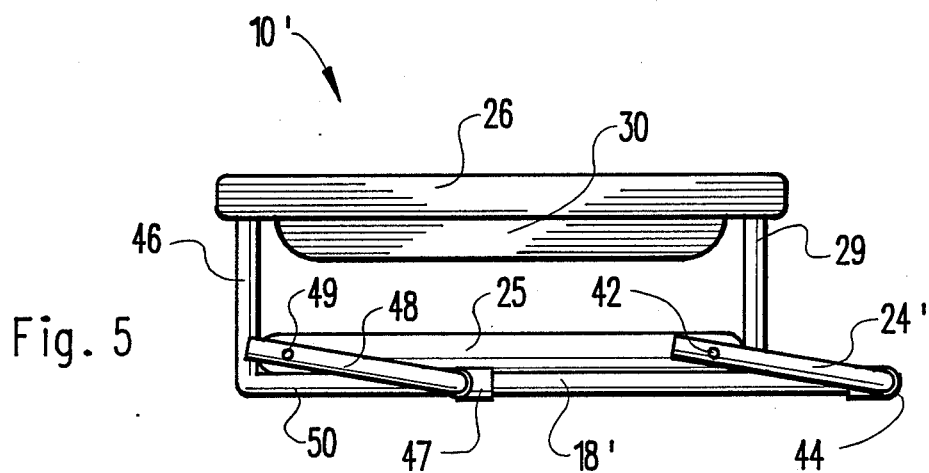
FIG. 5 is a side elevational view illustrating the car seat table of FIG. 4 folded to a lowered position.

FIG. 5 illustrates the tray table 10', with the pivotal frame members 28 and 24' folded to a lowered position. As previously described, the opposite, unseen side of the frame is symmetrically constructed, and a parallelogram linkage is thus provided which mounts both the lower tray 25 and upper tray 26 for vertical adjustment between the illustrated lowered position and the raised position illustrated in FIG. 4. It should be noted that in the lowered position of FIG. 5, the vehicle seat belt may be secured around the frame member 46. In both the first embodiment of the invention illustrated in FIGS. 1 and 2 and the second embodiment of the invention illustrated in FIGS. 3 through 5, the lower tray 25 serves as a support for the bottom surface of beverage containers received through the circular openings 34 and 36 provided in the upper tray 26. Additionally, the lower tray 25 may provide additional storage space for items such as books, paper, pencils, etc. While the tray table according to the present invention may be utilized by both adults and children, it is contemplated that the device is particularly suitable for usage by children riding in the rear seat of a vehicle. The upper tray portion 26 is specially configured to enable such small children to consume food and beverage items without spillage within the vehicle interior. The various components of the present invention are preferably formed from a molded plastic material, although other materials may be utilized without departing from the scope of the present invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A car seat table, comprising:
   an upper tray;
   a central recessed area formed on said upper tray;
   an upstanding peripheral rim on said upper tray, surrounding said central recessed area;
   at least one circular opening formed through said upper tray for receiving a beverage container;
   a removable insert having a reduced diameter opening dimensioned to be retained in said circular opening for use with different diameter beverage containers;
   a plurality of resilient radially inwardly extending fingers spaced around said insert for engagement with various different diameter beverage containers;
   an annular rim surrounding said circular opening in said tray for supporting said insert;
   a lower tray;
   an upper frame securing said upper and lower trays in parallel spaced relation, said frame formed by a plurality of rigid tubular members;
   a parallelogram linkage mounting said first and second trays for simultaneous movement in fixed relation between vertically raised lowered positions;
   said parallelogram linkage formed by four corner frame members each having a lower end pivotally mounted to corner portions of a fixed lower frame and an upper end pivotally mounted adjacent corner portions of said lower tray;
   two of said corner frame member dimensioned to receive a vehicle lap type seat belt in surrounding relation when in a vertical position; and
   said upper frame dimensioned for abutment with a vehicle seat back when in said raised position, whereby tightening of the vehicle seat belt will initially move said upper and lower trays to said raised position and will subsequently maintain said upper and lower trays in said raised position.

* * * * *